(12) United States Patent  (10) Patent No.: US 8,533,248 B2
Hondou  (45) Date of Patent: Sep. 10, 2013

(54) PROCESSING UNIT

(75) Inventor: Mikio Hondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 627 days.

(21) Appl. No.: 12/825,588

(22) Filed: Jun. 29, 2010

(65) Prior Publication Data

US 2010/0332573 A1  Dec. 30, 2010

(30) Foreign Application Priority Data

Jun. 30, 2009  (JP) .................................. 2009-154890

(51) Int. Cl.
  *G06F 7/548* (2006.01)
(52) U.S. Cl.
  USPC ........................................................ 708/276
(58) Field of Classification Search
  None
  See application file for complete search history.

(56) References Cited

U.S. PATENT DOCUMENTS

| 4,870,606 | A | | 9/1989 | Sasahara | |
|---|---|---|---|---|---|
| 4,899,302 | A | * | 2/1990 | Nakayama | 708/440 |
| 5,963,460 | A | * | 10/1999 | Rarick | 708/501 |
| 6,317,764 | B1 | * | 11/2001 | Rarick | 708/270 |
| 6,581,079 | B2 | * | 6/2003 | Rarick | 708/270 |
| RE39,385 | E | * | 11/2006 | Brightman et al. | 708/490 |
| 7,509,363 | B2 | * | 3/2009 | Clifton | 708/277 |
| 2002/0087608 | A1 | * | 7/2002 | Rarick | 708/440 |
| 2008/0228846 | A1 | | 9/2008 | Hondou et al. | |
| 2010/0332573 | A1 | * | 12/2010 | Hondou | 708/231 |

FOREIGN PATENT DOCUMENTS

| JP | 2002-63152 | 2/2002 |
|---|---|---|
| JP | 2008-234076 | 10/2008 |

OTHER PUBLICATIONS

S. Story et al., "New Algorithms for Improved Transcendental Functions on IA-64", Proceedings 14$^{th}$ IEEE Symposium on Computer Arithmetic, Apr. 1999, pp. 4-11.
European Search Report dated May 26, 2011 in corresponding European Patent Application 10166921.6.

* cited by examiner

*Primary Examiner* — David H Malzahn
(74) *Attorney, Agent, or Firm* — Staas & Halsey LLP

(57) ABSTRACT

A processing unit computes a trigonometric function, for decrease the number of instructions and improve throughput. In a floating point multiply-add circuit, an OR circuit, a selector and an EOR circuit are disposed, and an expansion point and expansion function of the Taylor series expansion of the trigonometric function are computed using a first trigonometric function operation auxiliary instruction for defining the operation of rd=(rs1*rs1)|(rs2 [0]<<63) and a second trigonometric function operation auxiliary instruction for defining the operation of rd=((rs2 [0])? 1.0: rs1)^(rs2 [1]<<63), or a third trigonometric function operation auxiliary instruction for defining the operation of rd=(rs1*rs1)|((~rs2 [0]<<63) and a fourth trigonometric function operation auxiliary instruction for defining the operation of rd=((rs2 [0])? rs1: 1.0)^((rs2 [1]^rs2 [0])<<63)).

8 Claims, 17 Drawing Sheets

FIG. 2 ftrimaddd  rs1,rs2,index,rd rd = rs1 * fabs(rs2) + T[rs2[63]][index]

ftrismuld   rs1,rs2,rd rd = (rs1 * rs1) |(rs2[0] << 63)

ftrisseld    rs1,rs2,rd rd = ((rs2[0]) ? 1.0 : rs1) ^ (rs2[1] << 63)

FIG. 5

$$\sin y = \sum_{n=0}^{7} ((-1)^n/(2 \cdot n+1)!) \cdot (x-x0)^{2n+1}$$

$$= y^1 - (1/3!) \cdot y^3 + (1/5!) \cdot y^5 \cdots \cdots - (1/15!) \cdot y^{15}$$

$$\cos y = \sum_{n=0}^{7} ((-1)^n/(2 \cdot n)!) \cdot (x-x0)^{2n}$$

$$= y^0 - (1/2!) \cdot y^2 + (1/4!) \cdot y^4 \cdots \cdots - (1/14!) \cdot y^{14}$$

FIG. 6

| bqx | | |
|---|---|---|
| [1] | [0] | |
| 0 | 0 | $\sin(y) = (y^0 - a3y^2 + \cdots - a15y^{14}) \cdot y$ |
| 0 | 1 | $\cos(y) = (y^0 - b2y^2 + \cdots - b14y^{14}) \cdot 1.0$ |
| 1 | 0 | $-\sin(y) = (y^0 - a3y^2 + \cdots - a15y^{14}) \cdot (-y)$ |
| 1 | 1 | $-\cos(y) = (y^0 - b2y^2 + \cdots - b14y^{14}) \cdot (-1.0)$ |

FIG. 7

PRE-PROCESSING PORTION (PRIOR ART):

```
lddf     [], x
fmaddd   x, rp2, bg, bqx
stdf     bqx, []
ldx      [], bqxi
sllx     bqxi, 63, m
srax     m, 63, m
fsubd    bqx, bg, qx
fnmsubd  qx, p2a, x, y
fnmsubd  qx, p2b, y, y
fmuld    y, y, y2
and      bqxi, 1, t
and      bqxi, 2, s
sllx     s, 62, s
stdf     y, []
ldx      [], yi
and      c1i, m, c1im
andn     yi, m, yim
or       c1im, yim, ysi
xor      ysi, s, ysi
stx      ysi, []
lddf     [], ys
sllx     t, 6, to
add      tab, to, ta
```

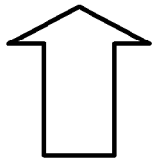

PRE-PROCESSING PORTION (EMBODIMENT):

```
lddf      [], x
fmaddd    x, rp2, bg, bqx fsubd     bqx, bg, qx
fnmsubd   qx, p2a, x, y
fnmsubd   qx, p2b, y, y
ftrismuld y, bqx, y2t ftrisseld  y, bqx, ys
```

FIG. 8

| OPERATION CODE | | CONTENT OF OPERATION |
|---|---|---|
| lddf | [],x | # x = mem |
| fmaddd | x,rp2,bg,bqx | # bqx = x * (1/($\pi$/2)) + 1.5*2**52 |
| | | #   = int (x * (1/($\pi$/2))) + 1.5*2**52 |
| | | #   = qx + 1.5*2**52 |
| fsubd | bqx,bg,qx | # qx = bqx - 1.5*2**52 |
| | | #   = int (x * (1/($\pi$/2)) |
| fnmsubd | qx,p2a,x,y | # y = x - qx * ($\pi$/2) |
| fnmsubd | qx,p2b,y,y | # y = y - qx * (the remainder of $\pi$/2) |
| | | #   = x - int (x * (1/($\pi$/2)*(1/($\pi$/2)) |
| | | #   = x - x0 |
| ftrismuld | y,bqx,y2t | # y2t = y**2 \| (bqx[0]<<63) |
| | | #   = (x-x0)**2 \| (((qx%4)%2) << 63) |
| ftrisseld | y,bqx,ys | # ys = ((bqx[0]) ? 1.0 : y)^(bqx[1]<<63) |
| | | #   = (((qx%4)%2) ? 1.0 : (x-x0)) |
| | | #     ^ (((qx%4)/2) << 63) |

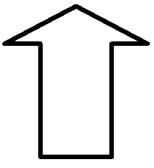

FIG. 11

| | | CONTENT OF OPERATION |
|---|---|---|
| ftrimaddd | c0,y2t7,r | # r = 0.0 * y2t[62:0] + COEFFICIENT 7<br># = COEFFICIENT7 |
| ftrimaddd | r,y2t,6,r | # r = r * y2t[62:0] + COEFFICIENT 6<br># = COEFFICIENT7 * (x-x0)**2 + COEFFICIENT 6 |
| ftrimaddd | r,y2t,5,r | # r = r * y2t[62:0] + COEFFICIENT 5<br># = (COEFFICIENT 7 ... + COEFFICIENT 6) * (x-x0)**2 + COEFFICIENT 5 |
| ftrimaddd | r,y2t,4,r | # r = r * y2t[62:0] + COEFFICIENT 4<br># = ((COEFFICIENT 7 ...+ COEFFICIENT 5) * (x-x0)**2 + COEFFICIENT 4 |
| ftrimaddd | r,y2t,3,r | # r = r * y2t[62:0] + COEFFICIENT 3<br># = (((COEFFICIENT 7 ...+ COEFFICIENT 4) * (x-x0)**2 + COEFFICIENT 3 |
| ftrimaddd | r,y2t,2,r | # r = r * y2t[62:0] + COEFFICIENT 2<br># = ((((COEFFICIENT 7 ...+ COEFFICIENT 3) * (x-x0)**2 + COEFFICIENT 2 |
| ftrimaddd | r,y2t,1,r | # r = r * y2t[62:0] + COEFFICIENT 1<br># = (((((COEFFICIENT 7 ... + COEFFICIENT 2) * (x-x0)**2 + COEFFICIENT 1 |
| ftrimaddd | r,y2t,0,r | # r = r * y2t[62:0] + COEFFICIENT 0<br># = ((((((COEFFICIENT 7 ... + COEFFICIENT 1) * (x-x0)**2 + 1.0 |
| fmuld | r,ys,r | # r = r * ys<br># r = ((((((COEFFICIENT 7 ... + COEFFICIENT 1) * (x-x0)**2 + 1.0)<br># * (((((qx%4)%2) ? 1.0 : (x-x0))<br># ^ (((qx%4)/2) << 63)) |
| stdf | r,[] | # mem = r |

| non-SIMD | PRIOR ART | EMBODIMENT | RATIO OF NUMBER OF INSTRUCTIONS |
|---|---|---|---|
| ld | 11 | 1 | 9% |
| st | 4 | 1 | 25% |
| int | 11 | 0 | 0% |
| fp | 13 | 14 | 108% |
| TOTAL | 39 | 16 | 41% |

FIG. 14

| non-SIMD | PRIOR ART | EMBODIMENT | RATIO OF PERFORMANCE |
|---|---|---|---|
| ld/st-pipe | 9.5 | 1.5 | |
| decode-pipe | 9.75 | 4 | |
| int-pipe | 5.5 | 0 | |
| fp-pipe | 6.5 | 7 | |
| WORST | 9.75 | 7 | 139% |

FIG. 15

| SIMD | PRIOR ART | EMBODIMENT | RATIO OF NUMBER OF INSTRUCTIONS |
|---|---|---|---|
| ld | 10 | 0.5 | 5% |
| st | 2.5 | 0.5 | 20% |
| int | 11 | 0 | 0% |
| fp | 6.5 | 7 | 108% |
| TOTAL | 30 | 8 | 27% |

FIG. 16

| SIMD | PRIOR ART | EMBODIMENT | RATIO OF PERFORMANCE |
|---|---|---|---|
| ld/st-pipe | 7.5 | 0.75 | |
| decode-pipe | 7.5 | 2 | |
| int-pipe | 5.5 | 0 | |
| fp-pipe | 3.25 | 3.5 | |
| WORST | 7.5 | 3.5 | 214% |

FIG. 18

| | TAYLOR SERIES EXPANSION POINT | $x0 = \pi/2*q$ |
|---|---|---|

| q%4 | EXPANSION FUNCTION | TAYLOR SERIES |
|---|---|---|
| 0 | cos(x-x0) | $\Sigma(-1)**n/(2*n)!*(x-x0)**(2*n)$ |
| 1 | -sin(x-x0) | $-\Sigma(-1)**n/(2*n+1)!*(x-x0)**(2*n+1)$ |
| 2 | -cos(x-x0) | $-\Sigma(-1)**n/(2*n)!*(x-x0)**(2*n)$ |
| 3 | sin(x-x0) | $\Sigma(-1)**n/(2*n+1)!*(x-x0)**(2*n+1)$ |

FIG. 19 ftricmuld = (rs1 * rs1) | ( (~rs2[0] << 63) )

ftricseld = ((rs2[0]) ? rs1 : 1.0) ^ ((rs2[1] ^ rs2[0] << 63))

FIG. 20

PRE-PROCESSING PORTION (EMBODIMENT):

| | |
|---|---|
| lddf | [],x |
| fmaddd | x,rp2,bg,bqx |
| fsubd | bqx,bg,qx |
| fnmsubd | qx,p2a,x,y |
| fnmsubd | qx,p2b,y,y |
| ftrismuld | y,bqx,y2t |
| ftrisseld | y,bqx,ys |

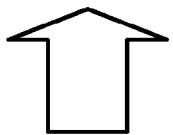

PRE-PROCESSING PORTION (PRIOR ART):

| | |
|---|---|
| lddf | [],x |
| fmaddd | x,rp2,bg,bqx |
| stdf | bqx,[] |
| ldx | [],bqxi |
| sllx | bqxi,63,m |
| srax | m,63,m |
| fsubd | bqx,bg,qx |
| fnmsubd | qx,p2a,x,y |
| fnmsubd | qx,p2b,y,y |
| fmuld | y,y,y2 |
| and | bqxi,1,t |
| srlx | bqxi,1,s |
| xor | s,t,s |
| sllx | s,63,s |
| stdf | y,[] |
| ldx | [],yi |
| andn | c1i,m,c1im |
| and | yi,m,yim |
| or | c1im,yim,ysi |
| xor | ysi,s,ysi |
| stx | ysi,[] |
| lddf | [],ys |
| xor | t,1,t |
| sllx | t,6,to |
| add | tab,to,ta |

FIG. 21

| OPERATION CODE | | CONTENT OF OPERATION |
|---|---|---|
| lddf | [],x | # x = mem |
| fmaddd | x,rp2,bg,bqx | # bqx = x * (1/($\pi$/2)) + 1.5*2**52 |
| | | #     = int (x * (1/($\pi$/2))) + 1.5*2**52 |
| | | #     = qx + 1.5*2**52 |
| fsubd | bqx,bg,qx | # qx = bqx - 1.5*2**52 |
| | | #    = int (x * (1/($\pi$/2)) |
| fnmsubd | qx,p2a,x,y | # y = x - qx * ($\pi$/2) |
| fnmsubd | qx,p2b,y,y | # y = y - qx * (the remainder of $\pi$/2) |
| | | #   = x - int (x * (1/($\pi$/2)) * (1/($\pi$/2)) |
| | | #   = x - x0 |
| ftricmuld | y,bqx,y2t | # y2t = y**2 | (~bqx[0]<<63) |
| | | #     = (x-x0)**2 | ((((qx%4)%2) ^ 1) << 63) |
| ftricseld | y,bqx,ys | # ys = ((bqx[0]) ? y : 1.0)^((bqx[1]^bqx[0])<<63) |
| | | #    = (((qx%4)%2) ? (x-x0) : 1.0) |
| | | #     ^ ((((qx%4)/2) ^ ((qx%4)%2)) << 63) |

FIG. 23

PRIOR ART

| TAYLOR SERIES EXPANSION POINT | $x0 = \pi/2 \cdot q$ |
|---|---|

| q%4 | EXPANSION FUNCTION | TAYLOR SERIES |
|---|---|---|
| 0 | sin(x-x0) | $\Sigma\ (-1)^{**}n/(2^*n+1)!^*(x-x0)^{**}(2^*n+1)$ |
| 1 | cos(x-x0) | $\Sigma\ (-1)^{**}n/(2^*n)!^*(x-x0)^{**}(2^*n)$ |
| 2 | -sin(x-x0) | $-\Sigma\ (-1)^{**}n/(2^*n+1)!^*(x-x0)^{**}(2^*n+1)$ |
| 3 | -cos(x-x0) | $-\Sigma\ (-1)^{**}n/(2^*n)!^*(x-x0)^{**}(2^*n)$ |

PROCESSING UNIT

CROSS-REFERENCE TO RELATED APPLICATIONS

This application is based upon and claims the benefit of priority of the prior Japanese Patent Application No. 2009-154890, filed on Jun. 30, 2009, the entire contents of which are incorporated herein by reference.

FIELD

The present invention relates to a processing unit which calculates mathematical functions.

BACKGROUND

Processing units which calculate mathematical functions, such as trigonometric functions, are used for various computers, including supercomputers. Such a processing unit normally calculates mathematical functions with approximation, using a Taylor series operation. For example, the mathematical function f(x) is given by the Taylor series operation expression as indicated by FIG. 22.

In order to calculate a value of the mathematical function f(x) in an arbitrary value (input argument) x using a Taylor series operation as indicated by FIG. 22, the calculation of the processing unit is divided into a pre-processing portion and a post-processing portion. The pre-processing portion determines an expansion point x0 of the Taylor series operation, and a table of the Taylor series coefficient $((1/n!) \cdot f^{(n)}(x0))$, corresponding to this expansion point. The post-processing portion executes the Taylor series operation in FIG. 22 using the Taylor series coefficient table.

If the mathematical function is a sin function, for example, an expansion point x0 of the Taylor series operation, as indicated by FIG. 23, is determined, and a Taylor series coefficient $((1/n! \cdot f^{(n)}(x0))$ corresponding to this expansion point is determined.

In other words, since a sin function has periodicity, when an integral multiple of $\pi/2$ is an expansion point near an input argument x, the Taylor series expansion point x0 is calculated by a quotient (q) of the input argument x divided by $\pi/2$. Then the expansion function and the Taylor series coefficient, corresponding to the remainder when the quotient (q) is divided by "4" (q %4), are determined.

If the remainder is "0", for example, the expansion function is sin (x−xo), the Taylor series coefficient is $((1/n!) \cdot f^{(n)}(x0))=(-1)^n/(2*n+1)!$. Therefore the Taylor series in FIG. 22 is $\Sigma(-1)^n/(2*n+1)!*(x-x0)^{(2n+1)}$. In FIG. 23, "**" indicates a power, "!" indicates a factorial, and "*" indicates multiplication.

In a prior art, determination of the Taylor series expansion function, data transfer between a floating point register and an integral register and computing processing using an integral computing unit for a mask operation, shift operation and the like execute to determine the Taylor series expansion function and to calculate an input argument for the expansion function before executing the Taylor series operation of a trigonometric function, by using such instructions as a load instruction and shift instruction, and.

[Patent Document 1] Japanese Patent Application Laid-Open No. 2008-234076 (FIG. 1 to FIG. 7)
[Patent Document 2] Japanese Patent Application Laid-Open No. 2002-063152 (FIG. 1 to FIG. 7)

Along with the current demand for faster computer processing, faster speed is also demanded of a Taylor series operation for mathematical functions. In prior art, in order to determine a Taylor series expansion function and to calculate the input argument for the expansion function, a data transfer between a floating point register and an integral register and complicated processing including mask operation and shift operation are required using such instructions as a load instruction and shift instruction. Therefore overhead other than a floating point operation (e.g. integral operation instruction and memory access instruction) is generated.

In other words, many instructions are required to process an entire mathematical function operation, therefore factors that drop performance, such as hampering instruction that issues throughput, exist.

SUMMARY

With the foregoing in view, it is an object of the present invention to provide a processing unit that makes mathematical function operation faster.

In order to attain the above objects, in this invention, a Processing unit has floating point multiply-add circuit that receives three inputs, which are rs1, rs2 and rs3, and executes floating point multiply-add operation; an OR circuit that computes OR of the most significant bit of output of the floating point multiply-add circuit and the least significant bit rs2 [0] of the input rs2; a selector that selects either the input rs1 or the value "1.0"; and an EOR circuit that computes EOR of a bit rs2 [1] that is one bit higher than the least significant bit of the input rs2 and the most significant bit of the selector, wherein an expansion point and an expansion function of the Taylor series expansion of a trigonometric function are computed based on a first trigonometric function operation auxiliary instruction for defining the operation of rd=(rs1*rs1)|(rs2 [0]<<63), and a second trigonometric function operation auxiliary instruction for defining the operation of rd=((rs2 [0])? 1.0: rs1)^(rs2 [1]<<63).

Further, to achieve the above objects, in this invention, a Processing unit has: a floating point multiply-add circuit that receives three inputs, which are rs1, rs2 and rs3, and executes floating point multiply-add operation; an OR circuit that computes OR of the most significant bit of output of the floating point multiply-add circuit and an inversion signal of the least significant bit rs2 [0] of the input rs2; a selector that selects either the input rs1 or the value "1.0"; a first EOR circuit that computes EOR of a bit rs2 [1] that is one bit higher than the least significant bit of the input rs2; and a second EOR circuit that computes EOR of the most significant bit of the selector and output of the first EOR circuit, wherein an expansion point and an expansion function of the Taylor series expansion of a trigonometric function are computed based on a third trigonometric function operation auxiliary instruction for defining the operation of rd=(rs1*rs1)|((~rs2 [0])<<63) and a fourth trigonometric function auxiliary instruction for defining the operation of rd=((rs2 [0])? rs1: 1.0)^((rs2 [1]^rs2 [0])<< 63)).

Since the OR circuit, selector and EOR circuit are disposed in the floating point production sum circuit, and an expansion point and expansion function of the Taylor series expansion of the trigonometric function are computed using the first trigonometric function operation auxiliary instruction for defining the operation of rd=(rs1*rs1)|(rs2 [0]<<63) and the second trigonometric function operation auxiliary instruction for defining operation of rd=((rs2 [0]) ? 1.0: rs1)^(rs2[1]<<63), or the third trigonometric function operation auxiliary instruction for defining operation of rd=(rs1*rs1)|((~rs2 [0])<<63) and the fourth trigonometric function operation auxiliary instruction for defining operation of rd=((rs2 [0]) ? rs1: 1.0)

^((rs2 [1]^rs2 [0])<<63)), a number of instructions can be decreased, and high-speed operation can be implemented.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 2 describes operation auxiliary instructions used in FIG. 1;

FIG. 5 describes the Taylor series of a trigonometric function;

FIG. 6 describes the Taylor series operation in FIG. 5;

FIG. 7 describes the instruction strings of the pre-processing of a sin function operation, which uses the trigonometric function operation auxiliary instruction according to the first embodiment;

FIG. 8 describes the instruction strings and content of the operation of the first embodiment in FIG. 7;

FIG. 10 describes instruction strings of a conventional post-processing and instruction strings of post-processing according to the present embodiment based on the assembler description;

FIG. 11 describes the relationship between operation codes based on assembler descriptions and the content of operations;

FIG. 12 describes a Taylor series operation sequence;

FIG. 13 describes a comparison of the number of instructions in the case of a non-SIMD (Single Instruction stream Multiple Data stream);

FIG. 14 describes a comparison of the operation throughput in the case of a non-SIMD;

FIG. 15 describes a comparison of the number of instructions in the case of an SIMD (Single Instruction stream Multiple Data stream);

FIG. 16 describes a comparison of the operation throughput in the case of an SIMD;

FIG. 18 describes the operation auxiliary instructions used in FIG. 17;

FIG. 19 describes the Taylor series of the trigonometric function in FIG. 17;

FIG. 20 describes the instruction strings of the pre-processing of a cosine function operation which uses a trigonometric function operation auxiliary instruction according to the second embodiment;

FIG. 21 describes the instruction strings of the second embodiment in FIG. 20 and the content of the operations;

FIG. 23 describes a conventional processing to determine an expansion point and expansion function.

DESCRIPTION OF EMBODIMENTS

Embodiments of the invention will now be described in a sequence of the first embodiment of the processing unit, description on pre-processing, description on post-processing, second embodiment of the processing unit and other embodiments, but the disclosed Processing unit is not limited to these embodiments.

(First Embodiment of Processing Unit)

Figure 1:
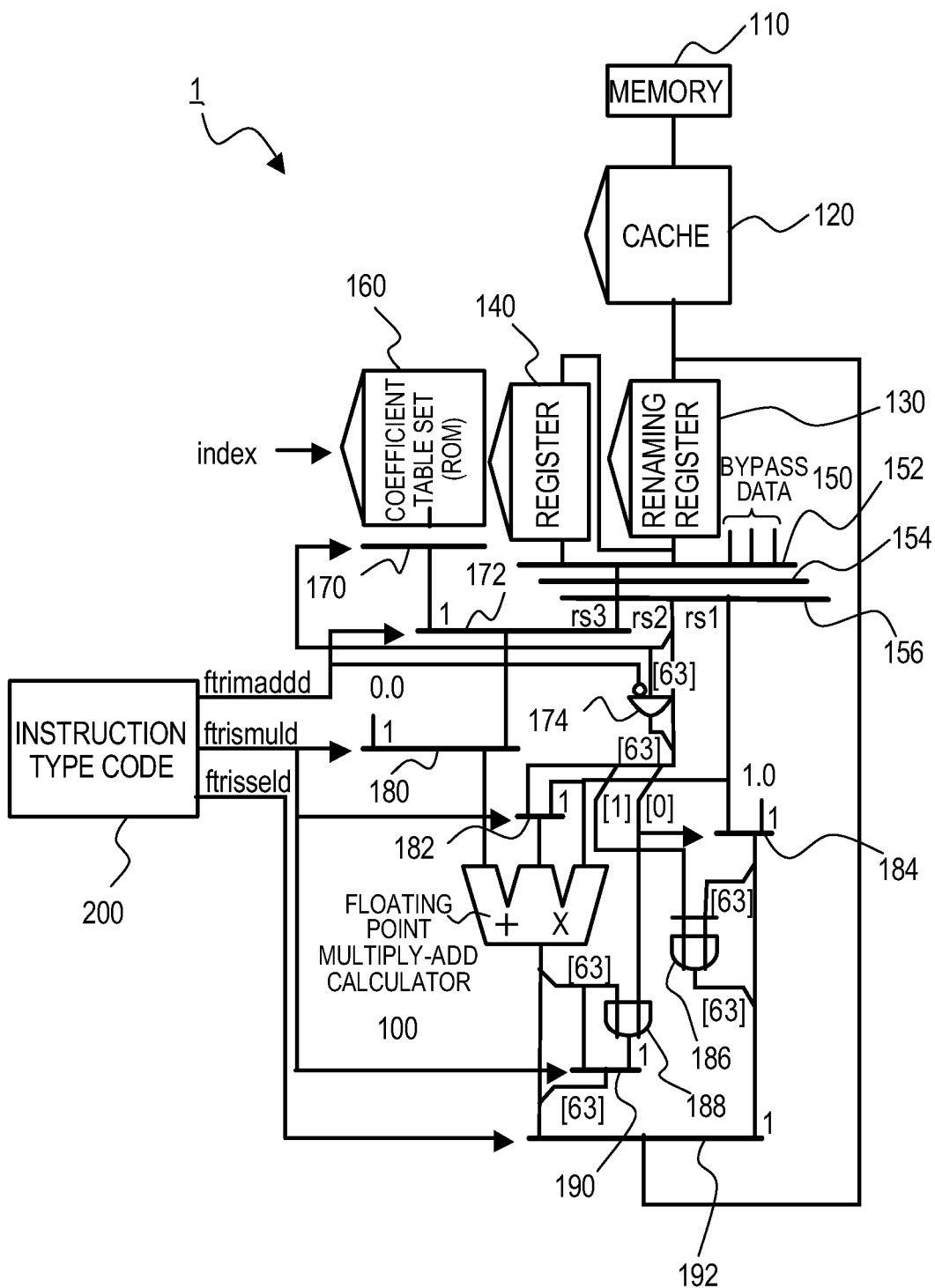
FIG. 1 is a circuit diagram depicting the processing unit according to the first embodiment of the present invention.
Figure 3:
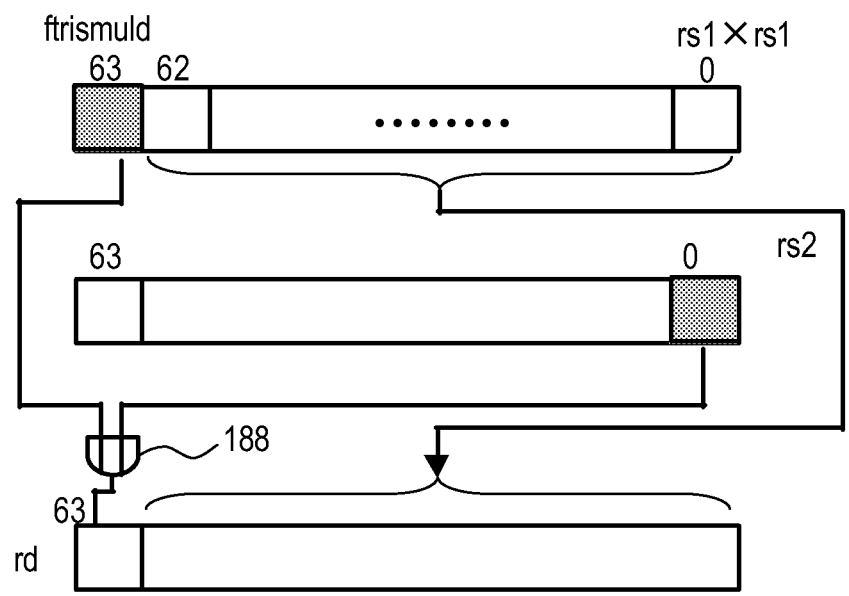
FIG. 3 is a diagram depicting a computing processing of the operation auxiliary instruction 2 in FIG. 2.
Figure 4:
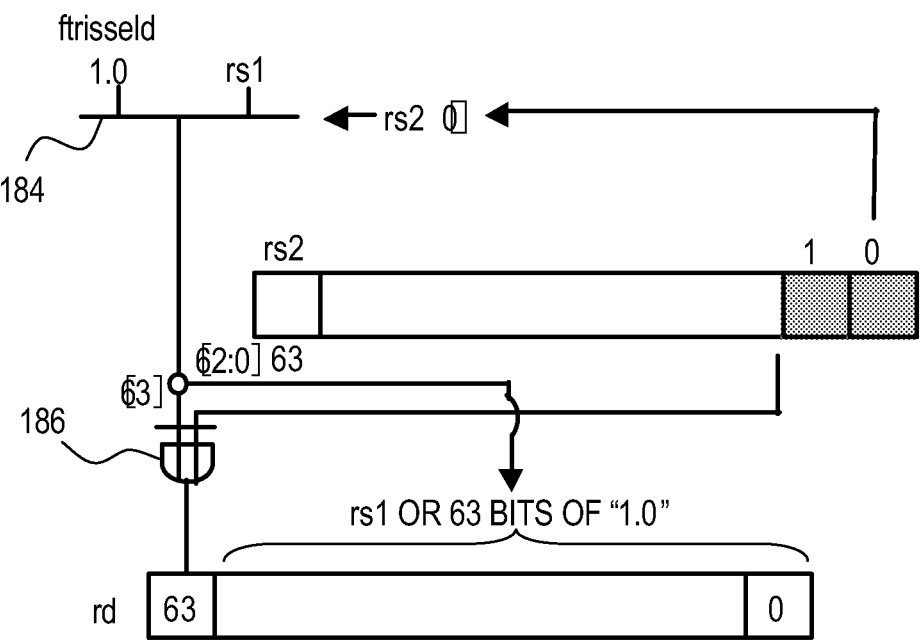
FIG. 4 is a diagram depicting a computing processing of the operation auxiliary instruction 3 in FIG. 2.

FIG. 1 is a circuit diagram of the processing unit according to the first embodiment of the present invention, FIG. 2 describes operation auxiliary instructions used in FIG. 1, and FIG. 3 and FIG. 4 are diagrams depicting a computing processing of the operation auxiliary instructions thereof.

As FIG. 1 depicts, dedicated trigonometric function operation auxiliary instructions are provided in the instruction type code 200 as instructions to determine the Taylor series expansion function and to execute processing to calculate the input argument to the expansion function (pre-processing) before executing the Taylor series operation of the trigonometric function depicted in FIG. 2.

FIG. 2 indicates an example of an assembler instruction of a sin function. The trigonometric function operation auxiliary instruction 2 (ftrismuld) and trigonometric function operation auxiliary instruction 3 (ftrisseld) are auxiliary instructions of the post-processing, and the trigonometric function operation auxiliary instruction 1 (ftrimaddd) is an auxiliary instruction in the later mentioned post-processing.

The trigonometric function operation auxiliary instruction 2 (ftrismuld) defines <one register number of multiplication of multiply-add operation: rs1>, <the other register number of multiplication of multiply-add operation: rs2> and <output register number of operation result of multiply-add operation: rd> in the operation target operand field.

The trigonometric function auxiliary instruction 2 (ftrismuld) is an instruction for computing rd=(rs1*rs1)|(rs2 [0]<<63). In other words, as FIG. 3 indicates, the arithmetic operation by the auxiliary instruction 2 executes to square the value of register rs1, and shift the data rs [0] in the [0] bit of the register rs2 to the left by 63 bits (shifted to the most significant bit). The arithmetic operation by the auxiliary instruction 2 further executes to arithmetic OR of the $63^{rd}$ bit of the square of the register rs1 and rs2 [0] in the result of shifting this value by 63 bits by the OR circuit 188, to replace the $63^{rd}$ bit of the square of the value in rs1 (64 bits) with the OR operation result, and to store this resultant data in the output register rd.

The trigonometric function operation auxiliary instruction 3 (ftrisseld), on the other hand, defines <one register number of the multiplication of the multiply-add operation: rs1>, <the other register number of the multiplication of the multiply-add operation: rs2>, and <output register number of operation result of multiply-add operation: rd> in the operand field.

The trigonometric function operation auxiliary instruction 3 (ftrisseld) is an instruction for computing rd=((rs2 [0]) ? 1.0: rs1)^(rs2 [1]<<63). In other words, as FIG. 4 depicts, the selector 184 is selected by rs2 [0] in the [0] bit of the register rs2. The value "1.0" (64 bits) and the data in register rs1 (64 bits) are input to the selector 184. The selector 184 selects the value "1.0" if rs2 [0]=1, and the data in register rs1 if rs2 [0]=0. Then the EOR circuit 186 computes EOR of the $63^{rd}$ bit of the output of the selector 184 and the value rs2 [1] in the "1" bit of the register rs2, replaces the $63^{rd}$ bit of the output of the selector 184 with the EOR operation result, and stores this result data in the output register rd.

The trigonometric function operation auxiliary instruction 1 (ftrimmddd), to be used for the post-processing, defines <one register number of multiplication of multiply-add operation: rs1>, <the other register number of multiplication of multiply-add operation: rs2>, <degree number of Taylor series: index>, and <output register number of operation result of multiply-add operation: rd>.

The trigonometric function operation auxiliary instruction 1 (ftrimaddd) is an instruction for executing rd=(rs1*fabs (rs2)+T [rs2 [63]] [index]). As mentioned later, this operation auxiliary instruction extracts the Taylor series coefficient of the degree specified by the index of the expansion function determined by T [rs [63]] from the table, and adds it with the result of multiplying the value in the register rs1 by the absolute value (fabs (rs2)) in the register rs2.

Referring back to FIG. 1, the processing unit 1 has a memory (main memory) 110, a cache memory 120 which stores a part of the data in the main memory 110, a renaming register 130, a register file 140, a bypass data 150, multiplexers 152 to 156 and a floating point multiply-add calculator 100.

The register file 140 has all the registers with which the floating point multiply-add calculator 100 uses to execute an operation. The renaming register 130 is disposed for cancelling the reverse dependence of operand data and output dependence. The bypass data 150 is data (operation result data) that is used for bypassing to cancel a data hazard in the instruction pipeline of the processing unit 1. The register value stored in the entry of the renaming register 130 is shifted to the register file 140 on retire.

A coefficient table set (ROM) 160, selectors 170 and 172 and one input inversion type AND circuit (one input inversion type logical-multiply operation circuit) 174 are used for the later mentioned post-processing. The coefficient table set 160 stores a coefficient of each degree of the Taylor series which is described in FIG. 9. In this coefficient table set 160, a Taylor series coefficient of the degree of corresponding expansion function is read from the selector 170 using the index for specifying a degree and the determined expansion function.

A selector 172 is operated by the above mentioned trigonometric function operation auxiliary instruction 1 (ftrimaddd), and outputs either the output of the selector 170 or data in the register rs3. A one input inversion type AND circuit 174 is used for post-processing, which is described later, and inverts the flag of the above mentioned trigonometric function operation auxiliary instruction 1 (ftrimaddd), and computes the AND of the inverted output and the $63^{rd}$ bit rs2 [63] in the register rs2.

A selector 180 is operated by the above mentioned trigonometric function operation auxiliary instruction 2 (ftrismuld), and outputs either the output of the selector 172 or the value "1.0" to the sum input of the floating point multiply-add calculator 100. A selector 182 is operated by the above mentioned trigonometric function operation auxiliary instruction 2 (ftrismuld), and outputs either the output of the register rs2 or the data in the register rs1 to the multiply input of the floating point multiply-add calculator 100.

A selector 184 is operated by the above mentioned trigonometric function operation auxiliary instruction 3 (ftrisseld). The selector 184 is input the value "1.0" (64 bits) and the data (64 bits) in the register rs1, and selects one of these data by the value rs2 [0] in the "0" bit of the register rs2, as described in FIG. 4. An EOR circuit 186 computes the EOR of the value in the $63^{rd}$ bit of the output of the selector 184 and the value rs2 [1] in the "1" bit of the register rs2.

An OR circuit 188 computes the OR of the $63^{rd}$ bit of the square of the data in the register rs1 computed by the floating point multiply-add calculator 100 and rs2 [0] after being shifted for 63 bits, as described in FIG. 3. A selector 190 selects either the $63^{rd}$ bit of the data computed by the floating point multiply-add calculator 100 or the output of the OR circuit 188. A selector 192 is operated by the above mentioned trigonometric function operation auxiliary instruction 3 (ftrisseld), and outputs either the output of the floating point multiply-add calculator 100 or the output of the selector 184.

This processing unit 1 has a normal configuration which has the memory (main memory) 110, the cache memory 120 which stores a part of the data in the main memory 110, the renaming register 130, the register file 140, the bypass data 150, the multiplexers 152 to 156 and the floating point multiply-add calculator 100.

In addition to these components, the selectors 180, 182, 184 190 and 192, EOR circuit 186 and OR circuit 188 are included for pre-processing. For post-processing as well, the coefficient table set 160, the selectors 170 and 172 and AND circuit 174 are included.

(Description on Pre-Processing)

FIG. 5 describes the Taylor series, FIG. 6 describes the Taylor series operation, FIG. 7 is a diagram depicting the instruction strings for pre-processing for a sine function operation that uses the trigonometric function operation auxiliary instruction of the present embodiment, and FIG. 8 describes the instruction strings of the present embodiment in FIG. 7 and content of the operations.

In the pre-processing of executing the Taylor series operation, the expansion point of the Taylor series operation near the input argument is determined so that the Taylor series operation converges at a high degree, and the Taylor series expansion function and the Taylor series coefficient, when the series is expanded at this expansion point, are determined.

First the Taylor series expansion expression will be described with reference to FIG. 5. As described in FIG. 23, the Taylor series expansion expression of the sine function is given by an odd functional expression ($y^{(2n+1)}$) of y (=x−x0). The Taylor series expansion expression of the cosine function, on the other hand, is given by an even functional expression ($y^{2n}$) of y (=x−x0).

If a coefficient of each degree of the Taylor series is a3, . . . a15, b2, . . . b14, a commonality appears in the Taylor series expansion expression of sine(y), cosine(y), −sine(y) and −cosine(y), as depicted in FIG. 6. In other words, sine(y) is a polynomial ($y^0 - a3 \cdot y^2 + \ldots - a15 \cdot y^{14}$) of an even function multiplied by y, cosine(y) is a polynomial ($y^0 - b2 \cdot y^2 + \ldots - b14 \cdot y^{14}$) multiplied by value "1.0". In the same manner, −sine (y) is a polynomial ($y^0 - a3 \cdot y^2 + \ldots - a15 \cdot y^{14}$) multiplied by −y, and −cosine(y) is a polynomial ($y^0 - b2 \cdot y^2 + \ldots - b14 \cdot y^{14}$) multiplied by value "−1.0".

In order to make the Taylor series operation in the post-processing faster using these relationships, "y" and "1.0" are selectively provided to the post-processing during pre-processing, in addition to computing the expansion point and determining the Taylor series expansion function.

FIG. 7 is a diagram depicting the instruction strings in the pre-processing of the sine function operation based on the assembler description according to prior art, and the instruction strings in the pre-processing of the sine function operation based on the assembler description according to the present embodiment. As FIG. 7 indicates, according to the present embodiment, load instruction, shift instruction, mask instruction or the like in the instruction string which is necessary to the conventional, can be eliminated by using the trigonometric function operation auxiliary instruction 2 (ftrismuld) and the trigonometric function operation auxiliary instruction 3 (ftrisseld). And in this embodiment, such complicated processing as transfer processing, shift operation and mask operation can be omitted, and the operation speed can be increased.

FIG. 8 depicts a relationship between operation codes based on assembler descriptions and content of operations, which are described in concrete terms using the configuration in FIG. 1. First the input argument mem is loaded to x using the load instruction (lddf). Then bqx=((x*rp2)+bg) is computed by the multiply-add instruction fmaddd (floating multiply add double).

In this case $1/(\pi/2)$ is set in the register rp2, and the value "1.5*2**52" is set in the register bg. By this instruction, the floating point multiply-add calculator 100 computes the product of x of the register file 140 and rp2, and the sum of this product and bg.

Thereby a quotient qx=int $(x/(\pi/2))$, which determines the expansion function and sign, is obtained in the lower 51 bits of the mantissa part of the operation result bqx. The reason of adding the value "1.5*2**52", is to round the decimals by adding a value of the 52th power. In other words, a rounding processing is executed.

The qx=bqx–bg is computed by the difference instruction fsubd (floating subtract double). The floating point multiply-add calculator 100 subtracts bg from bqx of the register file 140 to compute the difference qx using this instruction. The decimals are rounded by adding and subtracting bg.

Then y=x–(qx*p2a) is computed by the multiply-add instruction fnmsubd (floating negative multiply subtract double). The higher value of "$\pi/2$" has been set in the register p2a. The floating point multiply-add calculator 100 computes the product of qx of the register file 140 and p2a by this instruction, stores the result in the register, then reads this product and x, and computes the difference.

Then y=y–(qx*p2b) is computed by the multiply-add instruction fnmsubd. The lower values of "$\pi/2$" has been set in the register p2b. The floating point multiply-add calculator 100 computes the product of qx of the register file 140 and p2b by this instruction, stores the result in the register, then reads this product and y, and computes the difference.

Thereby (x–x0) of the Taylor series operation is obtained as y. Two multiply-add instructions fnmsubd are used here because the value of $\pi/2$ is divided into a higher value and lower value for the computing, so as to increase accuracy in decimals.

Then y2t=(y*y)|(bqx [0]<<63) is computed by the trigonometric function operation auxiliary instruction 2 (ftrismuld). In other words, the selector 182, which normally selects rs2, is switched by the instruction type code 200 "ftrismuld", so that rs1 is output from the selector 182. As a result, the floating point multiply-add calculator 100 squares the value y of the register rs1. To the OR circuit 188, data rs2 [0] in the "0" bit of the register rs2 is input, and the $63^{rd}$ bit of the output y**2 from the calculator 100 is input. The OR circuit outputs to the $63^{rd}$ bit of the output of the calculator 100 via the selector 190.

In other words, as depicted in FIG. 3, following operation is executed by the trigonometric function operation auxiliary instruction 2 (ftrismuld). The data is shifted to the left (shifted to the most significant bit), the OR of the $63^{rd}$ bit of the square of the data in the register rs1 and the data in rs2 [0], after being shifted for 63 bits, is computed by the OR circuit 188, the $63^{rd}$ bit of the square of the data in rs1 (64 bits) is replaced with the OR operation result, and this resultant data is stored in the output register rd of the register file 140 via the selector 192.

As described in FIG. 4, the lower 51 bits of the mantissa part of bqx is a quotient qx, and the least significant (lowest) bit bqx[0] of bqx indicates whether the Taylor series function is a sine function or cosine function, so the $63^{rd}$ bit of y2t indicates the type of Taylor series function (sine or cosine), and 62 to 0 bits are the square data of y (x–x0) described in FIG. 6.

Then rd=((rs2 [0])? 1.0: rs1)^(rs2 [1]<<63) is computed by the trigonometric function operation auxiliary instruction 3 (ftrisseld). Here ys=((bqx [0])? 1.0: y)^(bqx [1]<<63) is computed.

As indicated in FIG. 4, the selector 184 is selected by the value rs2 [0] in the "0" bit of the register rs2. The selector 184, to which the value "1.0" (64 bits) and the data in the register rs1 (64 bits) are input, selects the value "1.0" if rs2 [0] (bqx [0])=1, and selects the data y of the register rs1 if rs2 [0] (bqx [0])=0. Then the EOR circuit 186 calculates the EOR of the value in the $63^{rd}$ bit of the output of the selector 184 and the value rs2 [1] (bqx [1]) in the "1" bit of the register rs2, replaces the $63^{rd}$ bit of the output of the selector 184 with the EOR operation result, and stores this resultant data in the output register rd via the selector 192.

The $63^{rd}$ bit of this output ys indicates a sign (+ or –) of the Taylor expansion function, and 62 to 0 bits indicate y (x–x0) or "1.0" described in FIG. 6.

By disposing the trigonometric function operation auxiliary instructions 2 and 3 and the selectors 180, 182, 184, 190 and 192, the EOR circuit 186 and the OR circuit 188, which are operated by these instructions as described above, "y" and "1.0" of the Taylor series operation can be determined in addition to determining the Taylor series expansion function, with less number of instructions. As a result, speed of pre-processing can be increased.

(Description on Post-Processing)

Figure 9:
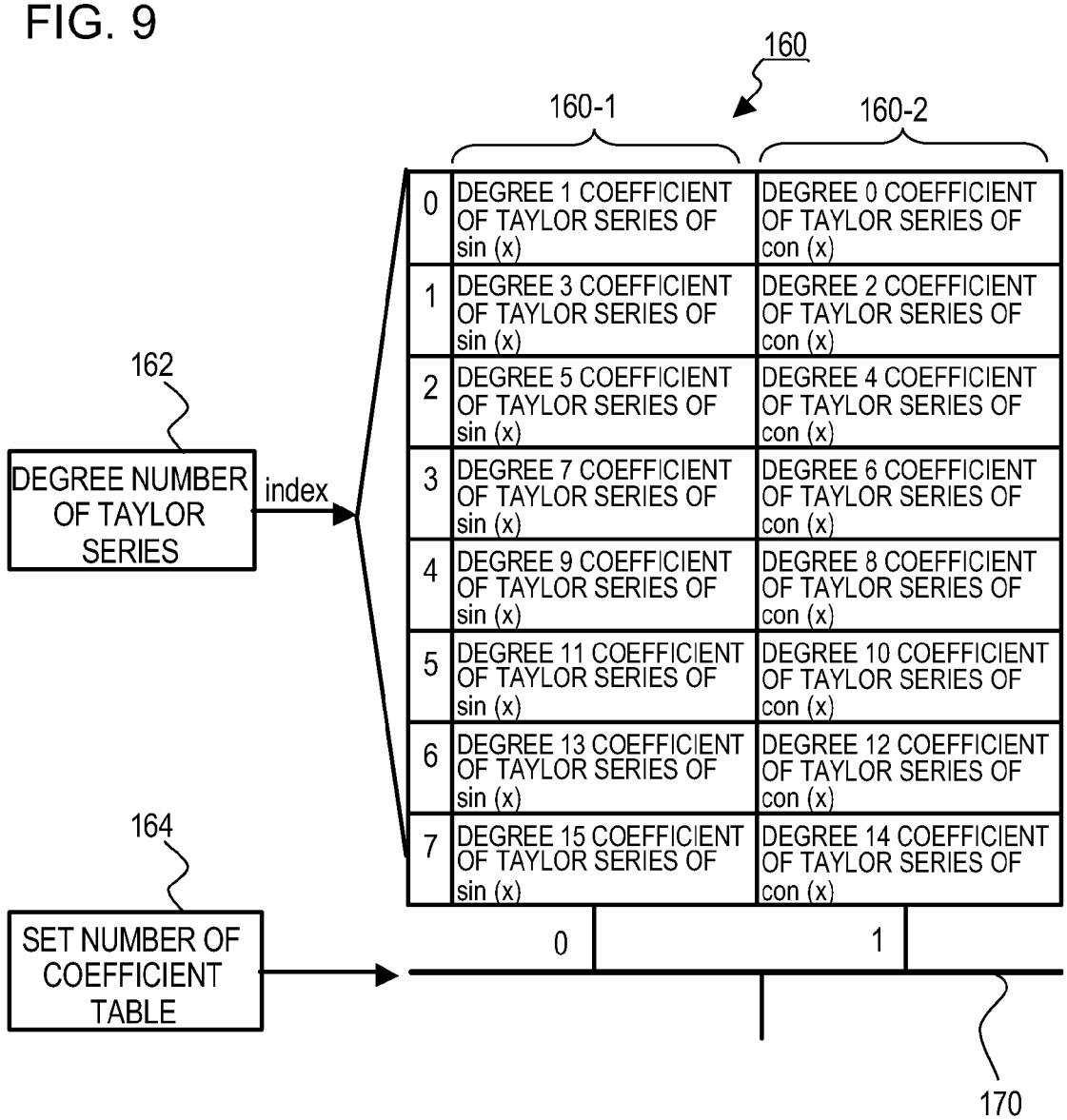
FIG. 9 is a diagram depicting a configuration of a coefficient table set in FIG. 1 according to an embodiment.

Now post-processing using the trigonometric function operation auxiliary instruction 1 will be described. FIG. 9 is a diagram depicting a configuration of the coefficient table set in FIG. 1 according to an embodiment. FIG. 10 describes the instruction strings of a conventional post-processing based on the assembler description and instruction strings of post-processing according to the present embodiment. FIG. 11 depicts the relationship between operation codes based on assembler descriptions and the content of operations.

As FIG. 9 indicates, the coefficient table set 160 has a sine function portion 160-1 which stores the coefficients of degrees 1 to 15 of the Taylor series' sine function, and a cosine function portion 160-2 which stores the coefficients of degrees 1 to 15 of the Taylor series' cosine function.

The selector 170 connected to the coefficient table set 160 selects a sine function or cosine function based on the set number of the coefficient table (bqx [0] and y2t [63] in FIG. 4). The degree of the coefficient table set 160 is also specified based on the index which indicates the degree number of the Taylor series.

FIG. 10 depicts a comparison of the instruction strings of post-processing of the sin function operation based on the assembler description according to a prior art, and the instruction strings of post-processing of the sin function operation based on the assembler description according to the present embodiment. As FIG. 10 depicts, according to the present embodiment, load instruction of instruction strings which is required by the conventional method can be eliminated by using the trigonometric function operation auxiliary instruction 1 (ftrimaddd), and therefore such complicated processing as transfer processing, shift operation and mask operation can be omitted, and operation speed can be increased.

Figure 12:
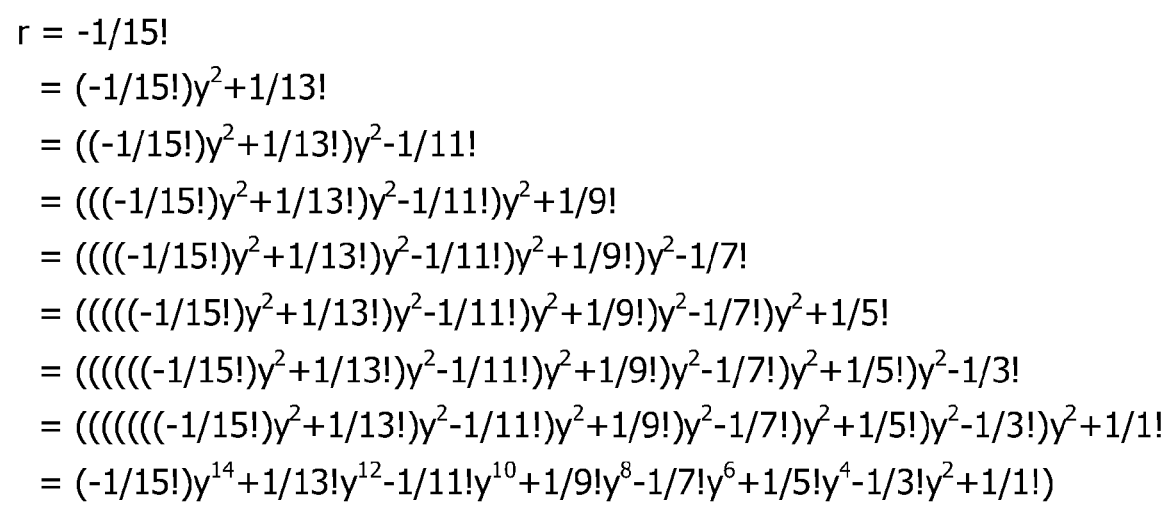

FIG. 11 indicates a relationship between the operation codes based on assembler descriptions and the content of the operation. FIG. 12 describes the operation sequence of FIG. 11. As FIG. 12 indicates, the operation sequence is from the coefficient having the highest degree, and using this result the coefficient having the second highest degree is computed and added sequentially. In other words, a coefficient having the highest degree (1/15!) is called up, then ((the coefficient of the previous degree*$y^2$) and the coefficient of the current degree) is computed using the trigonometric function operation auxiliary instruction 1 (ftrimaddd).

The computing processing in FIG. 11 will now be described in concrete terms using the configurations in FIG. 1 and FIG. 9. First in accordance with the trigonometric function operation auxiliary instruction 1 (ftrimaddd), rd= ((rs1*fabs(rs2)+T [rs2 [63]] [index]) is executed. The rs1=co=0.0 is set first, and the coefficient table set 160 is accessed by rs2 [63]=y2$t$ [63] and index=7 (degree 15), then the coefficient (1/15!) of the degree 15 of the sine function is extracted and is input to the calculator 100 via the selector 172.

Since the calculator 100 is set as rs1=co=0.0, the computing result r becomes r=1/15!, as depicted in FIG. 12.

Then the trigonometric function operation auxiliary instruction 1 (ftrimaddd) and the operation codes r, y2$t$, 6 and r are specified. The Taylor series coefficient of a degree specified by index=6 of the expansion function determined by T [y2$t$ [63]] is extracted from the table 160 via the selectors 170 and 172, using the operation auxiliary instruction 1.

The 63$^{rd}$ bit of rs2=y2$t$, on the other hand, is input to the AND circuit 174. Since flag "1" of the trigonometric function operation auxiliary instruction 1 (ftrimaddd) has been input to the inversion input of the AND circuit 174, the output of the AND circuit 174 is "0". Therefore the 63$^{rd}$ bit of rs2=y2$t$ is "0", which is input to the calculator 100 via the selector 182. In the register rs1, on the other hand, the above mentioned r has been stored, so the calculator 100 computes (r=r*y2$t$ [62:0]+coefficient), and stores the result in the register file 140 as r.

In the same manner, the same operation is performed by the trigonometric function operation auxiliary instruction 1 (ftrimaddd) and the operation code, while decreasing the degree as 5, 4, 3, 2, 1 and 0 sequentially. Thereby the computing result r in the final step indicated in FIG. 12 is obtained.

Then the multiply instruction (fmuld: multiply) and r, and rs2=ys and r, are specified. By this multiply instruction, the calculator 100 computes r=r*ys. The ys is y or 1.0, or −y or −1.0, so r=r*ys computed by the calculator 100 becomes the Taylor expansion series described in FIG. 6.

This result r is stored in the entry mem of the register file 140 by the store instruction (stdf).

By the trigonometric function operation auxiliary instruction 1, the coefficient table set 160, selectors 170 and 172 and the AND circuit 174, which are operated by this instruction as described above, the Taylor series expansion function can be computed with less number of instructions, and as a result, speed of post-processing can be increased.

Now comparing a number of instructions and performance between the present embodiment and prior art. FIG. 13 indicates a comparison of the number of instructions in the case of a non-SIMD (Single Instruction stream Multiple Data stream). FIG. 14 depicts a comparison of the operation throughput in the case of a non-SIMD.

As FIG. 13 indicates, there are many load instructions (ld), store instructions (st), and integral operation instructions (int) in the case of prior art. However, in the case of the present embodiment, the load instructions (ld), store instructions (st) and integral operation instructions (Int) are hardly used, and a number of instructions decreases to less than half (40%).

As FIG. 14 indicates, when only the trigonometric functions are vector-operated, then operation throughput improves 1.4 times that of prior art. And when trigonometric functions are operated in parallel with other operations, the ld/st pipe (pipeline of load instruction/store instruction, which are memory access instructions) is not consumed, so operation throughput can be improved even more so. Since the number of instructions is small and instructions are limited to floating point operation instructions, appropriate instruction scheduling can be easily performed with software pipelining, which improves performance.

FIG. 15 depicts a comparison of the number of instructions in the case of an SIMD (Single Instruction stream Multiple Data stream). FIG. 16 depicts a comparison of the operation throughput in the case of an SIMD.

As FIG. 15 depicts, there are many load instructions (ld), store instructions (st) and integral operation instructions (Int) in the case of prior art. However, in the case of the present embodiment, the load instructions (ld), store instructions (st) and integral operation instructions (Int) are hardly used, and a number of instructions decreases to about ¼ (27%). Since the integral operation instructions are not included, the present embodiment is suitable for an SIMD.

As FIG. 15 indicates, when only the trigonometric functions are vector-operated, then operation throughput improves 2.1 times that of prior art.

(Second Embodiment of Processing Unit)

Figure 17:
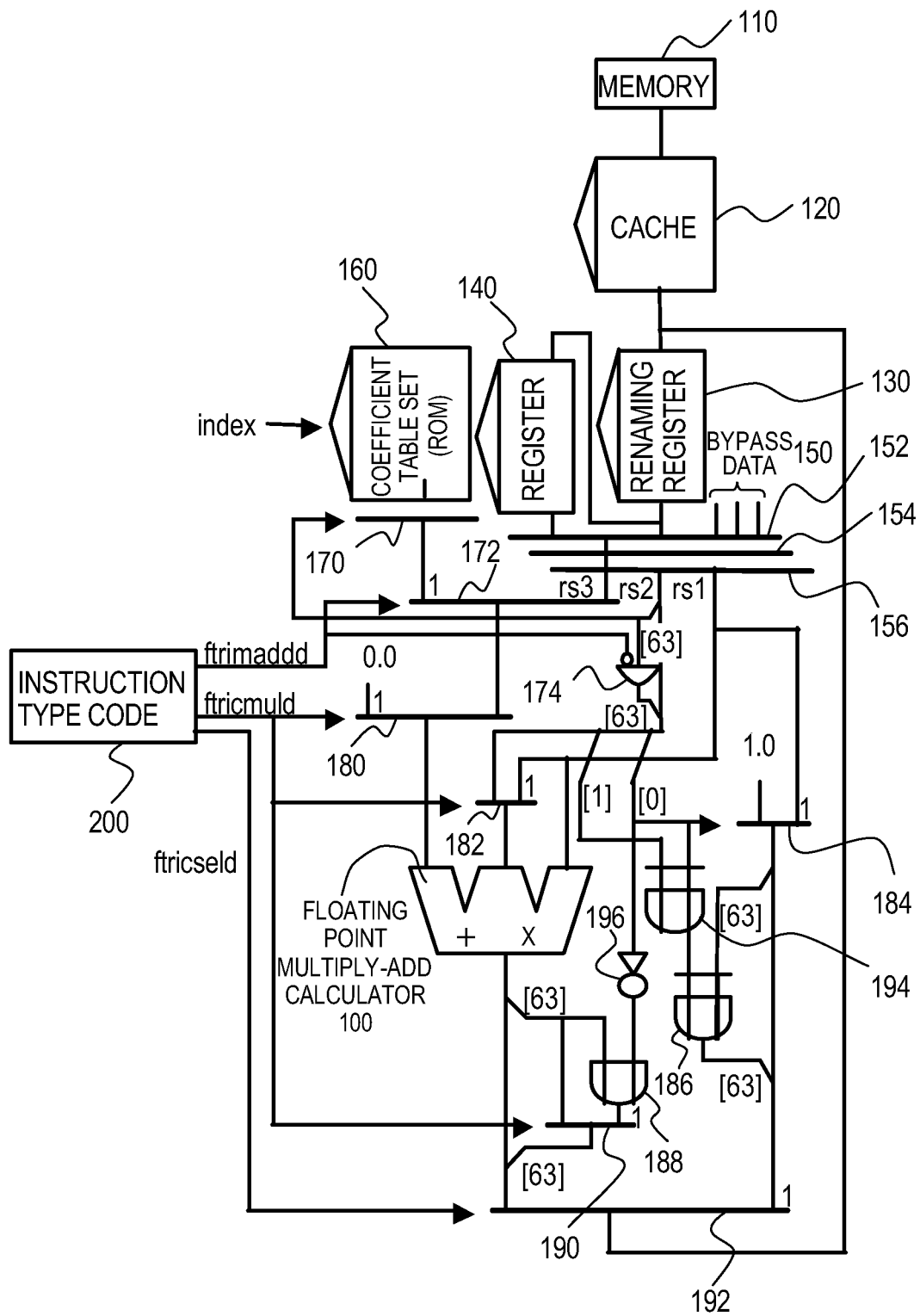
FIG. 17 is a circuit diagram depicting the processing unit according to the second embodiment of the present invention.
Figure 22:
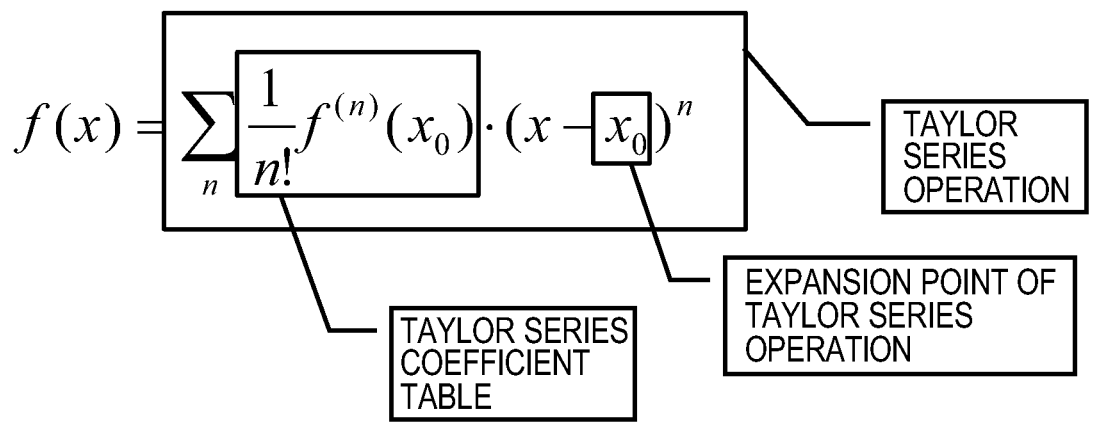
FIG. 22 is a diagram depicting a conventional Taylor series expansion of the trigonometric function.

FIG. 17 is a circuit diagram of the second embodiment of the processing unit of the present invention, FIG. 18 describes an expansion point and expansion function of the Taylor series of the cosine function operation used for FIG. 17. FIG. 19 describes the cosine operation auxiliary instruction used for FIG. 17. FIG. 20 and FIG. 21 describe the computing processing of the operation auxiliary instruction.

In FIG. 17, composing elements the same as FIG. 1 are denoted with a same reference numbers. The difference from FIG. 1 is that an inversion circuit 196 is disposed in the input stage of the OR circuit 190, and an EOR circuit 194 is disposed in the input stage of the EOR circuit 186. Also as FIG. 17 depicts, a dedicated trigonometric function operation auxiliary instruction is provided in the instruction type code 200, as an instruction to determine the Taylor series expansion function and to calculate an input argument to this expansion function (pre-processing step) before executing the Taylor series operation of a trigonometric function (cosine function) indicated in FIG. 18.

In FIG. 18, the definition of an expansion point and a Taylor series expression of the expansion function are the same as the case of the sin function in FIG. 23, but the expansion function corresponding to the value of the remainder of the quotient q is different from FIG. 23.

FIG. 19 indicates an example of the assembler instruction for a cosine function, and the trigonometric function operation auxiliary instruction 4 (ftricmuld) and the trigonometric function operation auxiliary instruction 5 (ftricseld) are used as the auxiliary instructions for the pre-process. In the same manner, the trigonometric function operation auxiliary instruction 1 (ftrimaddd) in FIG. 2 is used as the auxiliary instruction for the post-process.

The trigonometric function operation auxiliary instruction 4 (ftricmuld) defines <one register number of multiplication of multiply-add operation: rs1>, <the other register number of multiplication of multiply-add operation: rs2> and <output register number of operation result of multiply-add operation: rd> in the operand field.

And the trigonometric function operation auxiliary instruction 4 (ftricmuld) is an instruction to compute rd= (rs1*rs1)|(~rs2 [0]<<63). In other words, as same as FIG. 3, the trigonometric function operation auxiliary instruction 4

(ftricmuld) executes following process. The value of the register rs1 is squared, and the bitwise NOT (by the inversion circuit 196) of the data rs2 [0] in the "0" bit of the register rs2 is shifted to the left by 63 bits (shifted to the most significant bit), the OR of the $63^{rd}$ bit of the square of the data in the register rs1 and rs2 [0] after being shifted 63 bits is computed, the $63^{rd}$ bit of the square of the data in rs1 (64 bits) is replaced with the OR operation result, and this resultant data is stored in the output register rd.

The trigonometric function operation auxiliary instruction 5 (ftricseld), on the other hand, defines <one register number of multiplication of multiply-add operation: rs1>, <the other register number of multiplication of multiply-add operation: rs2> and <output register number of operation result of multiply-add operation: rd> in the operand field.

And the trigonometric function operation auxiliary instruction 5 (ftricseld) is an instruction to compute rd=((rs2 [0])? rs1: 1.0)^((rs2 [1] rs2 [0])<<63). In other words, as same as FIG. 4, the trigonometric function operation auxiliary instruction 5 (ftricseld) executes following process. The selector 184 is selected by the value rs2 [0] of the "0" bit of the register rs2. The selector 184, to which the value "1.0" (64 bits) and data in the register rs1 (64 bits) are input, selects the value "1.0" if rs2 [0]=0, and selects the data in the register rs1 if rs2 [0]=1. Then the EOR circuit 194 computes EOR of rs2 [1] and rs2 [0] in the "1" bit and "0" bit of register rs2. Then the EOR circuit 186 computes the EOR of the value in the $63^{rd}$ bit of the output of the selector 184 and the output of the EOR circuit 194, then the $63^{rd}$ bit of the output of the selector 184 is replaced with the EOR operation result, and this resultant data is stored in the output register rd.

FIG. 20 compares the instruction strings of the pre-processing of a cosine function operation based on prior art and the instruction strings of the pre-processing of the cosine function operation based on the assembler description according to the present embodiment. As FIG. 20 indicates, according to the present embodiment, load instruction, shift instructions, mask instructions or the like in instruction strings which are required by the conventional method can be eliminated by using the trigonometric function operation auxiliary instruction 4 (ftricmuld) and the trigonometric function operation auxiliary instruction 5 (ftricseld), therefore such complicated processing as transfer processing, shift operation and mask operation can be omitted, and speed of operation can be increased.

FIG. 21 describes in concrete terms the relationship between operation codes based on the assembler descriptions and the content of operation using the configuration in FIG. 17. First as same as the case of the sine function in FIG. 8, the input argument mem is loaded into x by the load instruction (lddf).

Then bqx=((x*rp2)+bg) is computed by the multiply-add instruction (fmaddd: multiply & add). In this case, 1/(π/2) has been set in the register rp2, and the value "1.5*2**52" has been set in the register bg. By this instruction, the floating point multiply-add calculator 100 computes the product of x of the register file 140 and rp2, and the sum of this product and bg.

Thereby a quotient qx=int (x/(π/2)), which determines the expansion function and sign, is obtained in the lower 51 bits of the mantissa part of the operation result bqx. The reason to add the value "1.5*2**52" means that when a value of the $52^{nd}$ power is added, the decimals are rounded, in other words, rounding processing is executed.

Then qx=bqx−bg is computed by the difference instruction (fsubd: subtract). The floating point multiply-add calculator 100 subtracts bg from bqx of the register file 140 to compute the difference qx using this instruction. The decimals are rounded by bg being added and subtracted.

Then y=x−(qx*p2a) is computed by the multiply-add instruction (fnmsubd: multiply & subtract). The higher value of "π/2" has been set in the register p2a. The floating point multiply-add calculator 100 computes the product of qx of the register file 140 and p2a by this instruction, stores the result in the register, then reads this product and x, and computes the difference.

Then y=y−(qx*p2b) is computed by the multiply-add instruction (fnmsubd: multiply & subtract). The lower value of "π/2" has been set in the register p2b. The floating point multiply-add calculator 100 computes the product of qx of the register file 140 and p2b by this instruction, stores [this resultant data] in the register, then reads this product and y, and computes the difference.

Thereby (x−x0) of the Taylor series operation is obtained as y. Two multiply-add instructions fnmsubd are used here, because the value of π/2 is divided into a higher value and lower value for computing, so as to increase accuracy in decimals.

The operation thus far is the same as the sine function in FIG. 8. Then y2t=(y*y)|(~bqx [0]<<63) is computed by the trigonometric function operation auxiliary instruction 4 (ftricmuld). In other words, the selector 182, which normally selects rs2, is switched by the instruction type code 200 "ftricmuld", and outputs rs1 from the selector 182. As a result, the floating point multiply-add calculator 100 squares the value y in the register rs1.

To the OR circuit 188, the bit (bitwise NOT) as a result of inverting the data rs2 [0] in the "0" bit of the register rs2 by the inversion circuit 196 is input, and the $63^{rd}$ bit of the output y**2 from the calculator 100 is input. The OR circuit 188 outputs the resultant data to the $63^{rd}$ bit of the output of the calculator 100 via the selector 190.

In other words, as indicated in FIG. 3, the following operations are executed. The data is shifted to the left (shifted to the most significant bit). The OR circuit 188 executes the OR operation of the $63^{rd}$ bit of the square of the data in the register rs1 and rs2 [0] after being shifted for 63 bits and inverted, and replaces the $63^{rd}$ bit of the square of the data in rs1 (64 bits) with the OR operation result. And this resultant data is stored, via the selector 192, in the output register rd of the register file 140.

As described in FIG. 4, the lower 51 bits of the mantissa part of bqx is a quotient qx and the least significant bit bqx [0] of bqx indicates whether the Taylor expansion function is a sine function or cosine function, so the $63^{rd}$ bit of y2t indicates the type of the Taylor expansion function (sin or cos), and 62 to 0 bits are the square data of y (x−x0) described in FIG. 6.

Then rd=((rs2 [0] (=bqx [0]))? rs1 (=y): 1.0)^((rs2 [1]^rs2 [0])<<63) is computed by the trigonometric function operation auxiliary instruction 5 (ftricseld). Here ys=((bqx [0])? y: 1.0)^((bqx [1]^bqx [0])<<63) is computed.

As depicted in FIG. 4, the selector 184 is selected by the value rs2 [0] in the "0" bit of the register rs2. The selector 184, to which the value "1.0" (64 bits) and the data in the register rs1 (64 bits) are input, selects the value "1.0" if rs2 [0] (bqx [0])=0, and selects the data y in the register rs1 if rs2 [0] (bqx [0])=1.

Then the EOR circuit 194 computes the EOR of the values rs2 [1] (bqx [1]) and rs2 [0] (bqx [0]) of the "1" bit and "0" bit of the register rs2. Then the EOR circuit 186 computes the EOR of the value in the $63^{rd}$ bit of the output of the selector 184 and the output of the EOR circuit 194, replaces the $63^{rd}$ bit of the output of the selector 184 with the EOR operation result, and stores this resultant data in the output register rd via the selector 192.

The 63$^{rd}$ bit of this output ys indicates a sign (+ or −) of the Taylor expansion function, and 62 to 0 bits indicate y (x−x0) or "1.0" described in FIG. 6. In the case of a cosine function, the remainder of q, as indicated in FIG. 18, corresponded to the expansion function, and "y" and "1.0" in FIG. 6 are specified by adding the above mentioned inversion circuit 196 and the EOR circuit 194.

By the trigonometric function operation auxiliary instructions 4 and 5, and the selectors 180, 182, 184, 190 and 192, EOR circuits 186 and 194, OR circuit 188 and inversion circuit 196, which are operated by these instructions, as described above, "y" and "1.0" of the Taylor series operation can be determined in addition to determining the Taylor series expansion function with less number of instructions. As a result, speed of pre-processing can be increased.

The post-processing is the same as the embodiment in FIG. 9 to FIG. 12.

Other Embodiments

In the above embodiment, the auxiliary instructions for increasing speed, even in post-processing, are used, but the present invention can also be applied in the case of not using such auxiliary instructions. According to the configuration in FIG. 17, the sine function can also be computed in the same manner, and a configuration to increase speed for both the sine function and cosine function can also be used by using the auxiliary instructions 2 and 3 of the sine function. The instruction strings may be constituted by an SIDM.

The present invention was described above using the embodiments, but the present invention can be modified in many ways within the scope of the spirit of the present invention, and these variant forms shall not be excluded from the scope of the present invention.

Since the OR circuit, selector and EOR circuit are disposed in the floating point multiply-add circuit, and an expansion point and expansion function of the Taylor series expansion of the trigonometric function are computed using the first trigonometric function operation auxiliary instruction for defining the operating of rd=(rs1*rs1)|(~rs2 [0]<<63) and the second trigonometric function operation auxiliary instruction for defining the operation of rd=((rs2 [0]) ? 1.0: rs1)^(rs2 [1]<<63), or the third trigonometric function operation auxiliary instruction for defining the operation of rd=(rs1*rs1)|((~rs2 [0])<<63) and the fourth trigonometric function operation auxiliary instruction for defining the operation of rd=((rs2 [0]) ? rs1: 1.0)^((rs2 [1]^rs2 [0])<<63), a number of instructions can be decreased, and high-speed operation can be implemented.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A processing unit, comprising:
   a floating point multiply-add circuit that receives three inputs, which are rs1, rs2 and rs3, and executes floating point multiply-add operation;
   a resistor file that the floating point multiply-add circuit uses;
   an OR circuit that computes OR of the most significant bit of output of the floating point multiply-add circuit and the least significant bit rs2 [0] of the input rs2, and outputs a signal indicating a type of expansion function of Taylor series expansion;
   a selector that selects either the input rs1 or the value "1.0"; and
   an EOR circuit that computes EOR of a bit rs2 [1] that is one bit higher than the least significant bit of the input rs2 and the most significant bit of the selector, and outputs a sign bit of the expansion function.

2. The processing unit according to claim 1, wherein the trigonometric function is a sine function, and wherein said selector, said OR circuit and said EOR circuit are operated according trigonometric function operation auxiliary instruction, and said trigonometric function operation auxiliary instruction comprises:
   a first trigonometric function operation auxiliary instruction for defining the operation of rd=(rs1*rs1)|(rs2 [0]<<63), where "|" indicates an OR operation and "<<" indicates a bit shift operation; and
   a second trigonometric function operation auxiliary instruction for defining the operation of rd=((rs2 [0])? 1.0: rs1)^(rs2 [1]<<63), where "?" indicates a select operation by rs2 [0] and "^" indicates an exclusive OR operation.

3. The processing unit according to claim 1, further comprising a second selector which selects the input rs1 or input rs2, and outputs the selected input to the floating point multiply-add computing unit according to said trigonometric function operation auxiliary instruction.

4. The processing unit according to claim 1, further comprising:
   a coefficient table storing unit that stores a coefficient of each degree of the Taylor series of the trigonometric function; and
   a circuit that reads a coefficient of the coefficient table using the computed expansion function,
   wherein the floating point computing unit executes the Taylor series operation of the trigonometric function using the computed expansion point and the coefficient which that has been read.

5. A processing unit, comprising:
   a floating point multiply-add circuit that receives three inputs, that are rs1, rs2 and rs3, and executes floating point multiply-add operation;
   an OR circuit that computes OR of the most significant bit of output of the floating point multiply-add circuit and an inversion signal of the least significant bit rs2 [0] of the input rs2, and outputs a signal indicating a type of expansion function of Taylor series expansion;
   a selector that selects either the input rs1 or the value "1.0";
   a first EOR circuit that computes EOR of a bit rs2 [1] that is one bit higher than the least significant bit of the input rs2; and
   a second EOR circuit that computes EOR of the most significant bit of the selector and output of the first EOR circuit, and outputs a sign bit of the expansion function.

6. The processing unit according to claim 5,
wherein the trigonometric function is a cosine function,
wherein said selector, said OR circuit and said first and second EOR circuits are operated according to trigonometric function operation auxiliary instruction, and
wherein said trigonometric function operation auxiliary instruction comprises:
- a third trigonometric function operation auxiliary instruction for defining the operation of rd=(rs1*rs1) |((~rs2 [0])<<63), where "~" indicates a bitwise NOT operation; and
- a fourth trigonometric function auxiliary instruction for defining the operation of rd=((rs2 [0])? rs1: 1.0)^((rs2 [1]^rs2 [0])<<63)).

7. The processing unit according to claim 5, further comprising a second selector which selects the input rs1 or input rs2, and outputs the selected input to the floating point multiply-add computing unit according to said trigonometric function operation auxiliary instruction.

8. The processing unit according to claim 5, further comprising:
- a coefficient table storing unit that stores a coefficient of each degree of the Taylor series of the trigonometric function; and
- a circuit that reads a coefficient of the coefficient table using the computed expansion function,
wherein the floating point computing unit executes the Taylor series operation of the trigonometric function using the computed expansion point and the coefficient that has been read.

* * * * *

UNITED STATES PATENT AND TRADEMARK OFFICE
CERTIFICATE OF CORRECTION

PATENT NO.       : 8,533,248 B2
APPLICATION NO.  : 12/825588
DATED            : September 10, 2013
INVENTOR(S)      : Mikio Hondou Page 1 of 1

It is certified that error appears in the above-identified patent and that said Letters Patent is hereby corrected as shown below:

In the Claims:

In Column 14, Line 34 (Approx.), In Claim 2, delete ""A"" and insert -- "^" --, therefor.
In Column 14, Line 51, In Claim 4, before "that" delete "which".

Signed and Sealed this
Twenty-fourth Day of December, 2013

Margaret A. Focarino
*Commissioner for Patents of the United States Patent and Trademark Office*